United States Patent [19]

Johnson

[11] 4,066,221

[45] Jan. 3, 1978

[54] METHOD OF AND APPARATUS FOR THE TAPE LOADING AND USE OF A SINGLE TURNTABLE IN THE RENDITION OF A TAPED PROGRAM

[76] Inventor: J. Ralph Johnson, 573 Wellham Loop, La Place, La. 70068

[21] Appl. No.: 736,277

[22] Filed: Oct. 27, 1976

[51] Int. Cl.$^2$ ............................................. B65H 17/48
[52] U.S. Cl. .............................................. 242/55.19 A
[58] Field of Search ................. 242/55.19 R, 55.19 A, 242/55.18; 352/126, 128

[56] References Cited

U.S. PATENT DOCUMENTS

| | | | |
|---|---|---|---|
| 1,382,040 | 6/1921 | Wilson | 242/55.19 R |
| 1,463,417 | 7/1923 | Blankenberg | 242/55.19 R |
| 2,255,724 | 9/1941 | Sunell | 242/55.18 X |
| 2,307,806 | 1/1943 | Schnoor | 242/55.19 R |
| 3,863,853 | 2/1975 | Umeda | 242/55.19 A |

*Primary Examiner*—Edward J. McCarthy
*Attorney, Agent, or Firm*—James B. Lake, Jr.

[57] ABSTRACT

A turntable is rotated to wind the tape of a taped program thereon in equal lengths per revolution thereof. Each equal winding forces the preceeding windings inwardly on the turntable to assume progressively curving paths as the respective windings recede from the periphery of the turntable. Pressure pads are equally spaced around the periphery of the turntable and rotate therewith. The pressure pads extend radially, and frictionally engage the top edges of the tape windings which follow increasingly curved paths therebetween as the equal windings are forced inwardly by succeeding equal windings. The ends of the tape are connected leaving a portion of the closed loop formed thereby for engagement by associated apparatus and rendition thereby of the taped program. Since all of the windings on the turntable are of the same length per rotation thereof, tape can be simultaneously wound on and off the turntable as it is rotated with no slippage and friction between windings, and as the beginning and end of the taped program are joined, the program can be repeated for as many performances as desired, with only monitoring for mechanical failures required.

9 Claims, 5 Drawing Figures

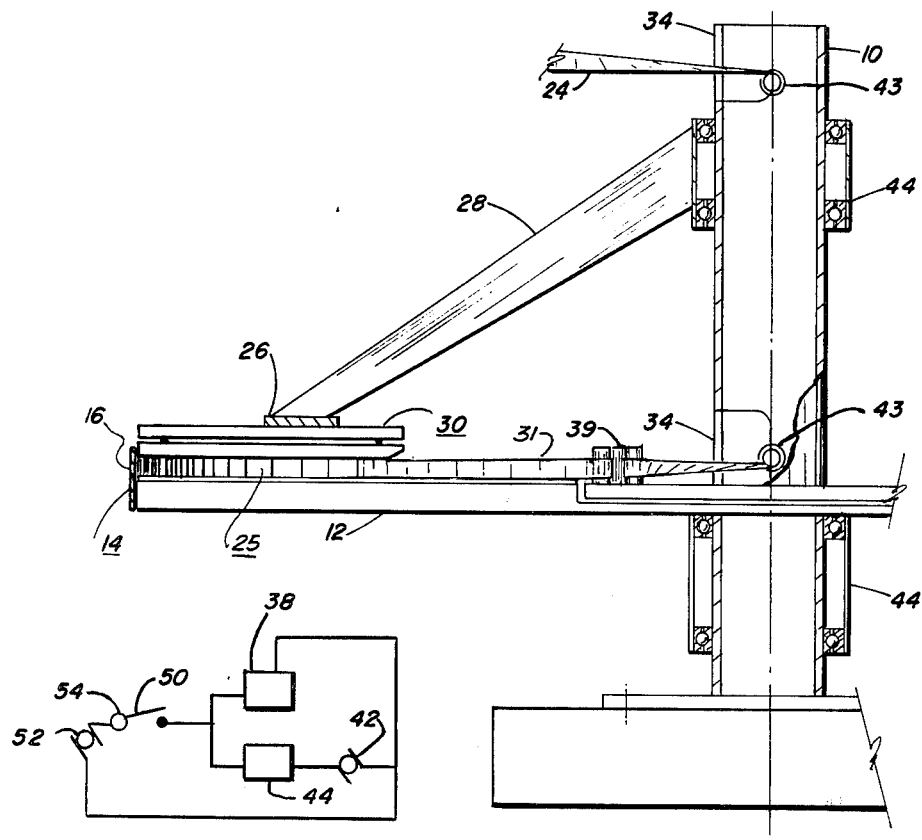
FIG. 5
FIG. 3
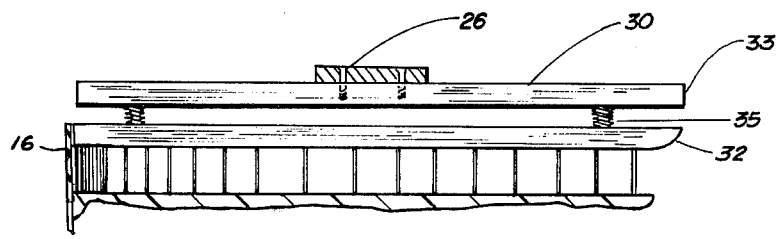
FIG. 4

4,066,221

METHOD OF AND APPARATUS FOR THE TAPE LOADING AND USE OF A SINGLE TURNTABLE IN THE RENDITION OF A TAPED PROGRAM

BACKGROUND OF THE INVENTION

The invention relates generally to a method of and apparatus for the loading and use of turntables in the rendition of taped programs, and more particularly in the loading and use of a single turntable on which the tape of a taped program is wound on and off simultaneously in equal amounts per revolution of the turntable.

Heretofore, the tape of a taped program of the length of a movie, television show or musical show, has been loaded on a turntable by winding it from the center outward, thereby varying the length of tape per revolution of the turntable directly with the radius of the winding. The outer end of the tape is led through an associated apparatus for the rendition of the taped program and out to be rewound from center on a second turntable. When the program ends, it can be replayed from the second turntable back onto the first turntable. The two turntables are required because they must turn at varying speeds to deliver and take up tape at a constant linear rate from turntable windings of varying radii.

Also in the prior art, winding tape from the center of a reel through a cooperating apparatus for the rendition of the taped program and peripherally re-winding it back on the same reel has necessarily been confined to very short lengths of tape loosely wound to allow for slippage and friction between windings due to the reel turning several times to reel off from the center the same lengths of tape that is peripherally reeled on in less than one revolution.

SUMMARY OF THE INVENTION

An object of the invention is to provide a method of and apparatus for loading the tape of a taped program on a turntable in equal amounts per revolution of the turntable.

Another object of the turntable is to provide a method of simultaneously feeding the tape of a taped program from a turntable loaded accordingly to the invention into an associated apparatus for rendering the taped program and thence rewinding it back on the same turntable for continuous renditions of the taped program.

Another object of the program is to provide a method of and apparatus for automating all succeeding renditions of a taped program after the first rendition in accordance with any desired schedule of time.

BRIEF DESCRIPTION OF THE SEVERAL VIEWS OF THE DRAWINGS

FIG. 3 is an enlarged fragmentary side view of the invention with several parts shown in cross-section,
and
FIG. 4 is an enlarged fragmentary view of a part of the invention as shown in FIG. 3.
FIG. 5 is a schematic diagram of an energizing circuit common to the invention and associated rendition apparatus.

DESCRIPTION OF INVENTION

Figure 1:
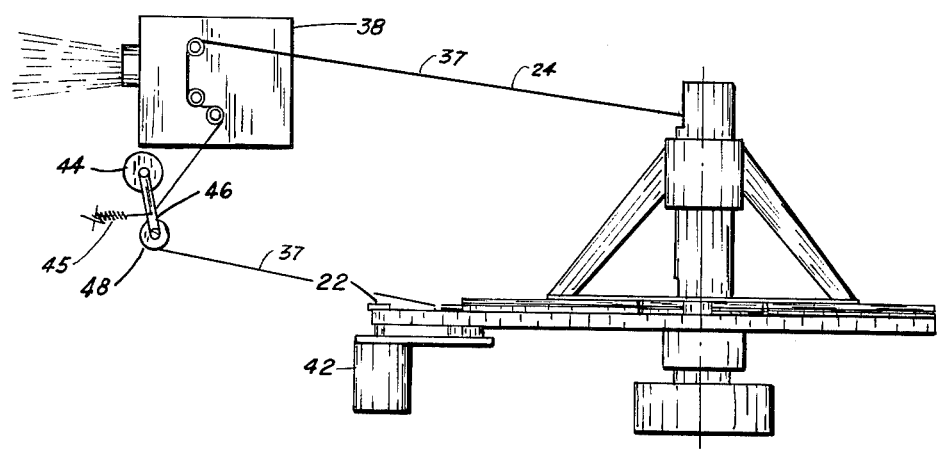
FIG. 1 is a diagrammatic side view of the invention.
Figure 2:
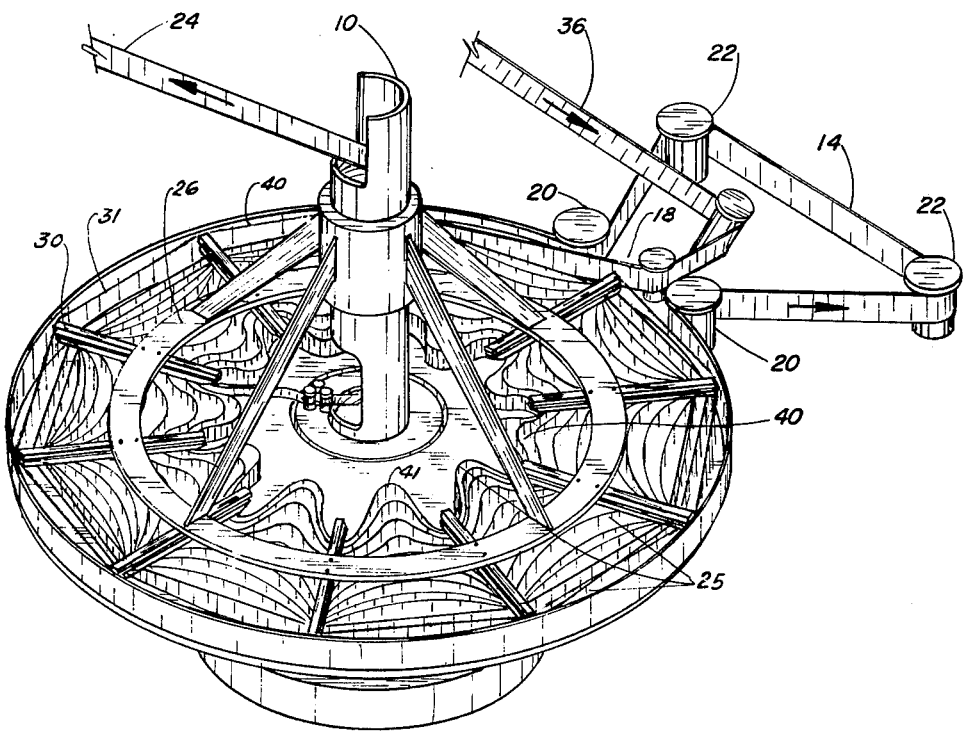
FIG. 2 is a three dimensional view from top and side of a turntable of the invention.

Referring to the FIGS. 1–4, the invention comprises a hollow stationary shaft 10 on which is mounted for rotation a turntable 12. A wide flat belt 14 is mounted peripherally around turntable 12 and drives it in rotation. Belt 14 extends upwardly from turntable 12 to define a peripheral flange 16 around most of the circumference of turntable 12 leaving a space 18 defined between two spacing rollers 20 mounted adjacent to turntable 12 and spaced peripherally apart and on which belt 14 travels out and around drive rollers 22 to permit the feeding of tape 24 of a taped program onto turntable 12 in equal windings 25 thereon as made against flange 16. A ring 26 is suspensively supported above turntable 12 by a plurality of radial arms 28 mounted for rotation around stationary shaft 10. A larger plurality of pressure pads 30 are fixed to the side of ring 26 to frictionally engage upper edges 31 of windings 25 with a spring biased lower part 32. Windings 25 curve equally inward on turntable 12 between pressure pads 30 to follow progressively more fluted or scalloped paths (see FIG. 2). Lower part 32 of a pressure pad 30 are biased downwardly by spring 35 mounted between upperpart 33 and lower part 32.

Stationary shaft 10 defines holes 34 above and below radial arm 28 through which tape 24 is led off turntable 12 to be connected to the end of tape 24 to form a closed loop, all of which, except for a bight 37 is wound in turntable 12. The bight is left free for feeding through an associated taped program apparatus 38 and back onto the turntable. The tape is directed through guides 39 for preventing slack and around rollers 43 mounted in said shaft respectively adjacent said shaft.

By rotating the turntable, taped program 24 is wound on table 12 under pads 30. At first, each winding 25 comprises a series of chords 40 between pressure pads 30. Each succeeding winding 25 pushes the preceding winding 25 into progressively more curved paths 41 as the equal lengths per revolution of taped program between radially oriented pressure pads 30 fits between progressively less space between pads 30 as the center of table 12 is approached.

Tape 24 is simultanously fed on and off turntable 12 and through cooperative apparatus 38 for the rendition of taped program in equal amount of tape per revolution of turntable 12 and thus without slippage and friction between the windings 25 on table 12.

A motor 42 drives rollers 22 to rotate turntable 12 by means of belt 14 and feed the tape on table 12. Associated apparatus 38 draws tape 24 off the turntable at requisite speed. Motor 42 is controlled by a rheostat 44 operable by a swinging arm 46 pivoted thereto, and having a roller 48 engaging the free bight 37 of the tape 24 between associated apparatus 38 and turntable 12 regulating the speed of motor 42 to maintain a tension on the tape commensurate with the rate of withdrawal by associated apparatus 38.

Motor 42 and taped-program-apparatus can be automated to turn off after every completed passage of the taped program therearound and through, or to finally cutoff after every third, or more, or less completed passages for a period of time until the next days schedule of running the taped program. Thus the running of the taped program after winding on turntable 12 is entirely automatic, to leave only monitoring for possible tape breakage and taped-program-apparatus failure which can be accomplished from a single station for any desired number of performances in any desired number of performance places.

For purposes of the application "tape" includes motion picture film, video tape and magnetic tape, and a "taped program" includes any transcription thereon for rendition therefrom.

The invention in cooperation with the associated rendition apparatus 38 can be automated by adding an off-on switch 50 to a common energizing circuit 52, therefor, that is operable by a time responsive element 54, whereby a schedule of daily renditions of the taped program can be set on said time responsive element 54 for daily repetitions of said schedule for an indefinite period (see FIG. 5).

What is claimed is:

1. Method of tape loading and using a turntable in the rendition of a taped program comprising the steps of:
   a. defining a peripheral flange and tape entrance therethrough around a rotating turntable:
   b. winding tape on said rotating turntable through said tape entrance and against said peripheral flange, the winding being of equal length per revolution of said turntable, each said winding being displaced radially inwardly by each successive winding and following inwardly curving paths of progressively greater curvature as the number of said windings increase;
   c. biasing radially said windings adjacent said flange at a plurality of spaced points therearound for inhibiting said windings from curving inwardly at said bias points and to maximize curving therebetween and equal distribution therearound;
   d. connecting the inboard and outboard tape ends of the loaded tape to form a closed loop with an off-turntable bight adapted to engage in and with cooperating apparatus for rendition of taped program;
   e. continuously rotating the loaded turntable and simutaneously energizing said cooperating apparatus to draw tape from the inner winding and load tape at the outer winding in equal amounts per revolution of said turntable in continuous renditions of the taped program and the elimination of friction and slippage between windings.

2. Method of tape loading and using a single turntable as described in claim 1 comprising an additional step:
   a. tensioning said bight of the tape loop for the maintenance thereof over several days operation by tension responsive controlling of the rotation of said turntable.

3. Method of tape loading and using a single turntable as described in claim 1 comprising an additional step:
   a. automating the operation of said single turntable and cooperative apparatus for the rendition of taped programs with time responsive energizing controls.

4. Apparatus for the tape loading and use of a single turntable in the rendition of a taped program comprising:
   a. means for peripherally flanging said turntable and rotating it on a hollow stationary shaft;
   b. means for winding equal lengths of tape of a taped program on said flanged turntable at the periphery per revolution thereof for progressively displacing preceeding windings inwardly by succeeding windings;
   c. means for leading a wound end of said tape off said turntable through associated rendition apparatus for the rendition of the taped program thereof; and
   d. means for connecting ends of said tape for peripheral re-winding on said turntable as said tape is wound off for the continuous rendition of the taped program.

5. Apparatus for the tape loading and use of a single turntable as described in claim 4 wherein said means for flanging and rotating said turntable comprises:
   a. a variable-speed motor mounted below said turntable;
   b. belt-drive pulleys mounted for rotation above said variable-speed motor and operably connected thereto;
   c. a drive belt operably mounted around said drive pulleys and the periphery of said turntable for the rotation thereof, said drive belt extending above said turntable and flanging it as said belt is driven in rotational engagement therewith for peripherally backing said tape wound peripherally thereon preventing any outward movement thereof as it is so wound and;
   d. variable-speed motor control means mounted to engage said tape before rewinding on said turntable and responsive to tape tension to vary electrical energy to said variable speed motor for coordinating linear amount of tape wound on and off said turntable;

6. Apparatus for the tape loading and use of a single turntable as described in claim 4 wherein said means for winding equal lengths of tape of a taped program on said flanged turntable per revolution thereof comprises:
   a. spaced rollers mounted adjacent said turntable for defining a tape lead-in space through said peripheral flange to peripherally wind said tape on said turntable;
   b. a plurality of radially extending elongated pressure pad means mounted on said hollow stationary shaft and spaced around and above said turntable with outboard ends engaging said peripheral flange, said means being adapted to pressure engage at spaced peripheral intervals, tape windings wound on said turntable and inhibit radial inward displacement of tape at said spaced peripheral intervals of engagement, leaving tape therebetween uninhibited to follow essentially harmonious paths of progressively greater inwardly radial curvature.

7. Means for winding equal lengths of tape of a taped program on said flanged turntable as described in claim 6 wherein said pressure pad means comprises:
   a. a plurality of radial arms mounted for rotation with said turntable on said hollow stationary shaft;
   b. a ring supported at the outboard ends of said radial arms; and
   c. a plurality of pressure pads mounted to and beneath said ring, said pressure pads having a rigid upper part for securing to said ring and a spring biased lower part for frictionally engaging said upper edges of said tape windings.

8. Apparatus for tape loading and using a single turntable as described in claim 4 wherein said means for leading a wound end comprises;
   a. guides for preventing the accumulation of slack mounted on an extension of said hollow stationary shaft;
   b. holes defined in said hollow stationary shaft spaced and above said turntable for leading tape from adjacent the center clear of said turntable;
   c. rollers horizontally mounted respectively adjacent said holes for guiding said tape in alignment therewith and changing direction of input and output therefrom.

9. Method of repeating a taped program for rendition by associated apparatus for any desired number of times, comprising the steps:
   a. Winding onto a turntable equal lengths of said taped program per revolution of said turntable, beginning with the starting end of said taped program and progressing to the finishing end thereof, the initial and following windings being sequentially wound on a common radius adjacent the periphery of said turntable, with each winding displacing radially inward the preceeding windings which become increasingly curved as the equal lengths thereof are constricted by progressively decreasing radii; and
   b. joining the finishing and starting ends of said taped program in an off-turntable bight that is drawn from adjacent the center of said turntable through said associated apparatus for the rendition thereof and returned to said turntable adjacent the periphery thereof in endless repitition for any desired number of renditions of said taped program.

10. Tape loading and unloading apparatus for use with a single turntable in continuous renditions of a taped program:
   a. means for rotating said turntable on a hollow stationary shaft;
   b. means for loading and unloading said tape program on said turntable in equal length windings per turntable revolution, said equal length windings being sequentially loaded peripherally and progressively displaced inwardly by succeeding peripheral windings, and being sequentially unloaded centrally through said hollow stationary shaft;
   c. tape pressure means mounted on said hollow shaft for rotation with said turntable and being spaced equally around the periphery of said turntable and extending radially inward to engage the tops of said tape windings for forming them in equally spaced and sized scallopes of progressively greater curvature from a peripheral winding toward said hollow stationary shaft; and
   d. connecting means for connecting said tape program end to end to form an off-turntable bight and engage in associated rendition apparatus for continuous renditions of said tape program.

* * * * *